United States Patent
Herbold et al.

(10) Patent No.: US 7,827,418 B2
(45) Date of Patent: Nov. 2, 2010

(54) CONTROLLING POWER DISTRIBUTION AMONG MULTIPLE WIRES IN COMMUNICATION CABLE

(75) Inventors: Jacob Herbold, Santa Barbara, CA (US); David McLean Dwelley, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 1088 days.

(21) Appl. No.: 11/334,733

(22) Filed: Jan. 19, 2006

(65) Prior Publication Data

US 2006/0178783 A1    Aug. 10, 2006

Related U.S. Application Data

(60) Provisional application No. 60/646,509, filed on Jan. 25, 2005.

(51) Int. Cl.
    *G06F 1/00* (2006.01)
(52) U.S. Cl. .................. 713/300; 713/320; 375/288; 307/31; 307/32
(58) Field of Classification Search .......... 713/300, 713/320; 375/288; 307/31, 32
    See application file for complete search history.

(56) References Cited

U.S. PATENT DOCUMENTS

| | | | | |
|---|---|---|---|---|
| 4,953,055 | A * | 8/1990 | Douhet et al. | 361/62 |
| 5,359,655 | A * | 10/1994 | Rademaker et al. | 379/401 |
| 5,473,244 | A * | 12/1995 | Libove et al. | 324/126 |
| 6,118,674 | A * | 9/2000 | Higashi | 363/71 |
| 6,166,527 | A | 12/2000 | Dwelley et al. | |
| 6,665,404 | B2 * | 12/2003 | Cohen | 379/413 |
| 6,715,087 | B1 * | 3/2004 | Vergnaud et al. | 713/300 |
| 6,760,430 | B2 * | 7/2004 | McGinn et al. | 379/322 |
| 6,973,394 | B2 | 12/2005 | Jaeger et al. | |
| 7,154,381 | B2 * | 12/2006 | Lang et al. | 340/310.11 |
| 7,457,252 | B2 * | 11/2008 | Karam et al. | 370/252 |
| 7,492,059 | B2 * | 2/2009 | Peker et al. | 307/71 |
| 2002/0191553 | A1 | 12/2002 | Lehr et al. | |
| 2003/0058595 | A1 * | 3/2003 | Murabayashi et al. | 361/90 |
| 2004/0012933 | A1 * | 1/2004 | Lewis et al. | 361/760 |
| 2004/0131123 | A1 * | 7/2004 | Maki et al. | 375/257 |

(Continued)

FOREIGN PATENT DOCUMENTS

CN    1364026 A    8/2002

(Continued)

OTHER PUBLICATIONS

International Search Report for International application No. PCT/US2006/002241, Filing Date: Jan. 23, 2006.

(Continued)

*Primary Examiner*—Thomas Lee
*Assistant Examiner*—Jaweed A Abbaszadeh
(74) *Attorney, Agent, or Firm*—McDermott Will & Emery LLP

(57) ABSTRACT

A novel system and methodology for supplying power over a communication cable, such as an Ethernet cable, using power distribution circuitry for controlling power distribution between wires or pairs of wires in the communication cable. The power distribution circuitry may control distribution of current among wires or pairs of wires in the communication cable. In particular, balance of current among the wires or pairs of wires may be provided.

23 Claims, 4 Drawing Sheets

U.S. PATENT DOCUMENTS

| | | | | |
|---|---|---|---|---|
| 2004/0160312 | A1* | 8/2004 | Fisher et al. | 340/310.01 |
| 2004/0174251 | A1* | 9/2004 | Fisher et al. | 340/310.01 |
| 2004/0212423 | A1 | 10/2004 | Inagaki | |
| 2005/0044431 | A1* | 2/2005 | Lang et al. | 713/300 |
| 2005/0104633 | A1* | 5/2005 | Elend | 327/108 |
| 2005/0169243 | A1* | 8/2005 | Lehr et al. | 370/351 |
| 2005/0220021 | A1* | 10/2005 | Sosnowski et al. | 370/235 |
| 2006/0115007 | A1* | 6/2006 | Karam et al. | 375/257 |
| 2006/0163949 | A1* | 7/2006 | Barrass | 307/19 |

FOREIGN PATENT DOCUMENTS

| | | |
|---|---|---|
| CN | 1157022 C | 7/2004 |
| CN | 1540858 A | 10/2004 |
| FR | 2 800 955 A1 | 4/2000 |

OTHER PUBLICATIONS

Chinese Office Action issued in Chinese Patent Application No. 200680005472X dated Nov. 7, 2008.

Chinese Office Action issued in Chinese Patent Application No. 2006800031997 dated Nov. 7, 2008.

Chinese Office Action issued in Chinese Patent Application No. 2006800031925 dated Nov. 7, 2008.

* cited by examiner

CONTROLLING POWER DISTRIBUTION AMONG MULTIPLE WIRES IN COMMUNICATION CABLE

This application claims priority of provisional U.S. patent application No. 60/646,509 filed on Jan. 25, 2005, and entitled "SYSTEM AND METHOD FOR SUPPORTING ADVANCED POWER OVER ETHERNET SYSTEM."

TECHNICAL FIELD

This disclosure relates to power supply systems, and more particularly, to circuitry and methodology for controlling power distribution among multiple wires of a communication cable in a system for supplying power over the communication cable.

BACKGROUND ART

Over the years, Ethernet has become the most commonly used method for local area networking. The IEEE 802.3 group, the originator of the Ethernet standard, has developed an extension to the standard, known as IEEE 802.3af, that defines supplying power over Ethernet cabling. The IEEE 802.3af standard defines a Power over Ethernet (PoE) system that involves delivering power over unshielded twisted-pair wiring from a Power Sourcing Equipment (PSE) to a Powered Device (PD) located at opposite sides of a link. Traditionally, network devices such as IP phones, wireless LAN access points, personal computers and Web cameras have required two connections: one to a LAN and another to a power supply system. The PoE system eliminates the need for additional outlets and wiring to supply power to network devices. Instead, power is supplied over Ethernet cabling used for data transmission.

As defined in the IEEE 802.3af standard, PSE and PD are non-data entities allowing network devices to supply and draw power using the same generic cabling as is used for data transmission. A PSE is the equipment electrically specified at the point of the physical connection to the cabling, that provides the power to a link. A PSE is typically associated with an Ethernet switch, router, hub or other network switching equipment or midspan device. A PD is a device that is either drawing power or requesting power. PDs may be associated with such devices as digital IP telephones, wireless network access points, PDA or notebook computer docking stations, cell phone chargers and HVAC thermostats.

The main functions of the PSE are to search the link for a PD requesting power, optionally classify the PD, supply power to the link if a PD is detected, monitor the power on the link, and disconnect power when it is no longer requested or required. A PD participates in the PD detection procedure by presenting a PoE detection signature defined by the IEEE 802.3af standard.

If the detection signature is valid, the PD has an option of presenting a classification signature to the PSE to indicate how much power it will draw when powered up. Based on the determined class of the PD, the PSE applies the required power to the PD.

The IEEE 802.3af standard describes power supply over the Ethernet by using the common mode voltage between 2 of the 4 twisted pairs within the CAT-5 cable. Presently the specification calls for providing power over 4 of the 8 wires typically contained in the unshielded twisted pair (UTP) CAT-5 cable. Future efforts to supply more power may use all 4 twisted pairs within the cable. Employing the second set of pairs would create a second path for current to be sent and returned through the cable.

As the wires within the cable were originally intended only for data transmission, they have limited current carrying capability. Because multiple wires or groups of wires may be employed to transmit power, it would be desirable to balance the power between wires to provide the most efficient power transmission operation.

SUMMARY OF THE DISCLOSURE

The present disclosure offers a novel system and methodology for supplying power over a communication cable, such as an Ethernet cable, using power distribution circuitry for controlling power distribution among wires or pairs of wires in the communication cable.

In accordance with one aspect of the disclosure, the power distribution circuitry may control distribution of current among wires or pairs of wires in the communication cable. For example, balance of current among the wires or pairs of wires may be provided.

To control current distribution between first and second wires within a pair of wires in the cable, windings of a transformer for coupling a power supply device to the communication cable may be split into a first winding corresponding to the first wire, and a second winding corresponding to the second wire. A capacitive element may be inserted between the first and second windings to prevent a DC connection between the first and second wires.

In accordance with an exemplary embodiment of the disclosure, the power distribution circuitry may comprise a reference circuit for providing a reference voltage, first and second sense resistors corresponding to first and second wires or pairs of wires, and first and second operational amplifiers for respectively comparing the reference voltage with first and second sense voltages across the first and second sense resistors.

The power distribution circuitry may further comprise first and second driving elements respectively coupled to outputs of the first and second operational amplifiers for controlling current values in the first and second wires or pairs of wires. Each of the first and second driving elements may include a MOSFET transistors.

In accordance with another exemplary embodiment of the disclosure, the power distribution circuitry may comprise a reference circuit for providing a reference voltage, a first sense resistors corresponding to a first wire or pair of wires, and a current limit amplifier for comparing the reference voltage with a first sense voltage across the first sense resistor to limit a current value in the first wire or pair of wires in accordance with the reference voltage.

The power distribution circuitry may further comprise a second sense resistor corresponding to a second wire or pair of wires, and a balance amplifier for comparing a second sense voltage across the second sense resistor with the first sense voltage to provide a balance between current values in the first and second wires or pairs of wires. First and second driving elements may be respectively coupled to outputs of the current limit amplifier and the balance amplifier for controlling the current values in the first and second wires or pairs of wires. Each of the first and second driving elements may include one or more MOSFET transistors.

In accordance with a further exemplary embodiment of the disclosure, the power distribution circuit may comprise a pair of current sense elements and a first difference amplifier for producing a signal representing a difference between signals produced by the current sense elements. A pair of second and third difference amplifiers may have first inputs for receiving the output of the first difference amplifier, and second inputs for receiving respective reference values. A reference value supplied to the second difference amplifier may differ from a reference value supplied to the third difference amplifier. First and second driving elements may be respectively coupled to outputs of the second and third difference amplifiers for controlling current values in the respective wires.

In accordance with another aspect of the disclosure, a local area network may comprise at least a pair of network nodes, a network hub, and communication cabling having at least a pair of wires for connecting the network nodes to the network hub to provide data communications. The network hub may have a power supply device for providing power to a load over the communication cabling. The network may include power distribution circuitry for controlling distribution of power among the wires or pairs of wires.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using the example of power distribution circuitry in a PoE system. It will become apparent, however, that the concepts described herein are applicable to any system for providing power over a cable. For example, the system of the present disclosure may be provided in a local area network (LAN) having a plurality of nodes, a network hub and communication cabling connecting the nodes to the network hub for providing data communications. The network hub may include a power supply device for supplying power to a load over the communication cabling. A power distribution system of the present disclosure may be used for controlling power distribution among wires or pairs of wires in the communication cabling.

Figure 1:
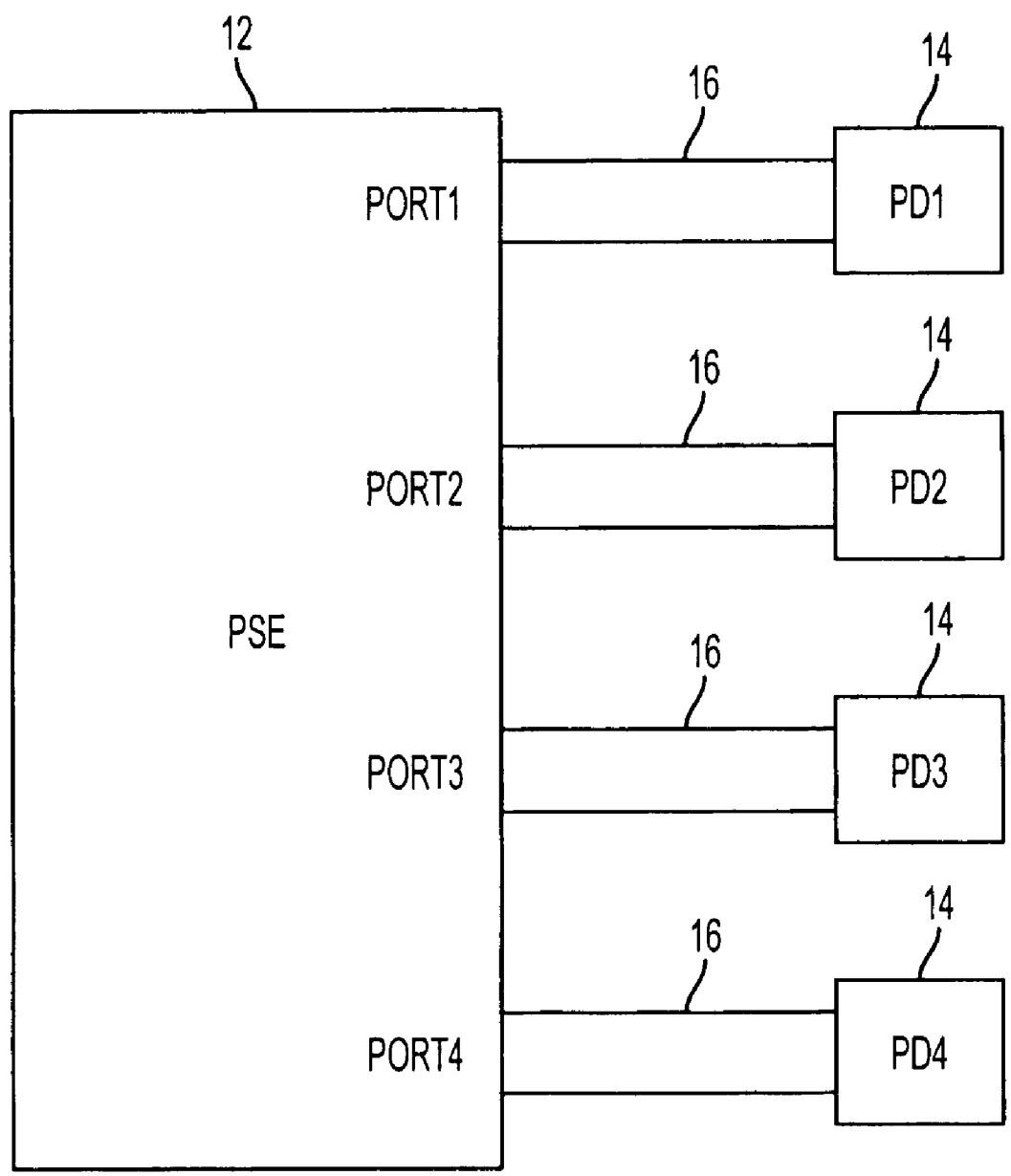
FIG. 1 is diagram illustrating a PoE system of the present disclosure.

FIG. 1 shows a simplified block-diagram illustrating a Power over Ethernet (PoE) system 10 including Power Sourcing Equipment (PSE) 12 having multiple ports 1 to 4 connectable to Powered Devices 14 (PD1 to PD4) via respective links, each of which may be provided using 2 or 4 sets of twisted pairs within an Ethernet cable 16. Although FIG. 1 shows four ports of the PSE 12, one skilled in the art would realize that any number of ports may be provided.

The PSE 12 may interact with each PD in accordance with the IEEE 802.3af standard. In particular, the PSE 12 and the PD participate in the PD detection procedure, during which the PSE 12 probes a link to detect the PD. If the PD is detected, the PSE 12 checks the PD detection signature to determine whether it is valid or non-valid. The valid and non-valid detection signatures are defined in the IEEE 802.3af standard. While the valid PD detection signature indicates that the PD is in a state where it will accept power, the non-valid PD detection signature indicates that the PD is in a state where it will not accept power.

If the signature is valid, the PD has an option of presenting a classification signature to the PSE to indicate how much power it will draw when powered up. For example, a PD may be classified as class 0 to class 4. Based on the determined class of the PD, the PSE applies the required power to the PD.

To provide more power to a PD, it may be necessary to use more wires in the Ethernet cable 16. When multiple wires or groups of wires are used, distributing the power among them becomes very important.

In particular, the power distribution makes it possible to use the Ethernet cable more efficiently. If the cable is composed of n wires, each with the maximum capacity of $\zeta$, when half of the wires is used to supply current to the PD and the other half is used to return current to the PSE, the maximum power Z that can be delivered by the cable is $Z=n\zeta/2$. Thus, to use the cable more efficiently, power must be distributed among the wires such that no single wire carries more than $\zeta$.

Even if the cable is not transmitting at its maximum capacity Z, power loss over the cable is reduced when the power transmitted over each wire is equal (assuming that each wire has equal capability $\zeta$). Thus, it would be advantageous to balance power among the wires in the cable. Accordingly, if n identical wires deliver power P, the most efficient way to transmit that power is to balance the power so as to transmit power p on each wire, where $p=P/n$. Where a half of the wires are used to send current and the other half is used to return the current, this equation becomes $p=P/2n$.

Further, when current flows through a wire, some power is lost due to the resistance R of the wire. If voltage $V_i$ is applied to the input of the wire, and current I flows through the wire, the voltage $V_o$ at the output of the wire is $V_o=V_i-IR$. Hence, the power lost due to transmission over the wire is $P_{lost}=I(V_i-V_o)=I^2R$. Consequently, when current flows over a cable composed of identical wires with the same resistance R, and the voltage applied to each wire is the same, power lost due to power transmission is minimized when current flowing through each wire is minimized. Current in each wire is minimized, when all n wires carry the same current I/n.

When the wires that compose the cable are identical, current should be balanced to provide the same current in each wire in order to provide power savings. When the wires in the cable are not identical, it may be advantageous to control a current level on each wire to achieve the maximum efficiency.

Although the present disclosure is made using the example of a current balancing circuit that balances current among wires to provide desired power distribution, one skilled in the art would realize that other parameters of the power supply system also may be controlled to distribute power among wires. For example, the power distribution may be provided by controlling the voltage applied to each wire or by controlling the resistance through which current is applied to each wire.

Further, in accordance with an exemplary embodiment of the disclosure, the power distribution control takes place at the end of the cable where power is applied. However, one skilled in the art would realize that the power distribution control of the present disclosure may be implemented at the end of the cable where power is consumed.

Also, one skilled in the art would realize that instead of controlling or equalizing current in each wire, the power distribution control of the present disclosure may be achieved by controlling or equalizing the output voltage of each wire, the power lost over each wire, the resistance of each wire and source of power, the temperature of each wire, etc.

Moreover, one skilled in the art would realize that the power distribution control method of the present disclosure does not require continuous measurement of parameters like wire resistance or output voltage. For example, the wire resistance determined before applying power may be used for controlling power transmission after applying power. The wire resistance may be measured, for example, using time domain reflectometry (TDR) by applying a high frequency pulse to the wire and measuring the returned signal indicating changes in the wire impedance.

Figure 2:
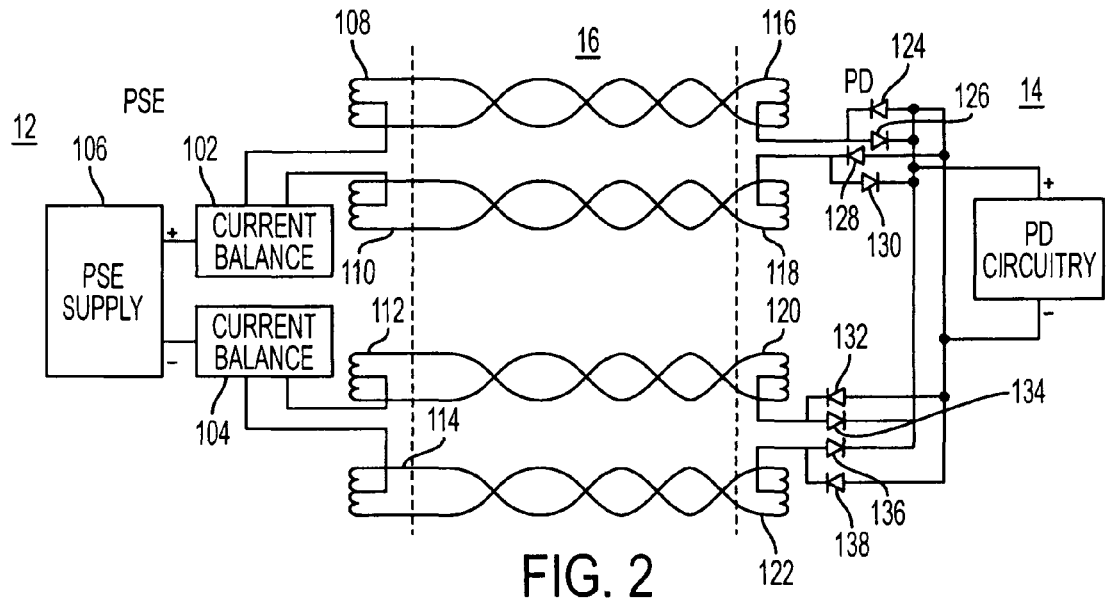
FIG. 2 illustrates a power distribution system of the present disclosure in which power is distributed among twisted pairs of wires.

As shown in FIG. 2, an exemplary power distribution system of the present disclosure comprises current balancing circuits 102 and 104 for balancing power supplied by a PSE power supply 106 among 4 twisted pairs of wire in the Ethernet cable 16. In particular, on the PSE side of the Ethernet cable 16, transformers 108 and 110 couple the current balancing circuit 102 to the top 2 twisted pairs of wires shown in FIG. 2, whereas transformers 112 and 114 couple the current balancing circuit 104 to the bottom 2 twisted pairs of wires shown in FIG. 2. For example, the top 2 twisted pairs may be used to send current from the PSE 12 to the PD 14, and the bottom 2 twisted pairs may provide a return path for the current from the PD 14 to the PSE 12.

On the PD side of the cable 16, transformers 116 and 118 couple the top 2 twisted pairs of wires to the PD circuitry via diode bridges composed of diodes 124, 126 and 128, 130, respectively. Transformers 120 and 122 couple the bottom 2 twisted pairs of wires to the PD circuitry via diode bridges composed of diodes 132, 134 and 136, 138, respectively. The diode bridges are arranged to enable the PD circuitry to receive power no matter which twisted pairs are utilized for sending or returning current. The transformers 108-122 may be data transformers of an Ethernet data transmission system. To preserve the clarity of the diagram, FIG. 2 shows only one winding of each of these transformers. As described in the IEEE 802.3af standard, the other windings of the transformers are used for coupling Ethernet physical layer (PHY) devices to the cable 16.

The current balancing circuit 102 controls the power supplied by the PSE power supply 106 so as to provide the same current in each of the top 2 twisted pairs used for sending current from the PSE 12 to the PD 14. The current balancing circuit 104 causes each of the bottom 2 twisted pairs used for returning current from the PD 14 to the PSE 12 to carry the same current. Although the arrangement shown in FIG. 2 handles the current balancing on the PSE side, one skilled in the art would realize that the current balancing may be implemented on the PD side.

Figure 3:
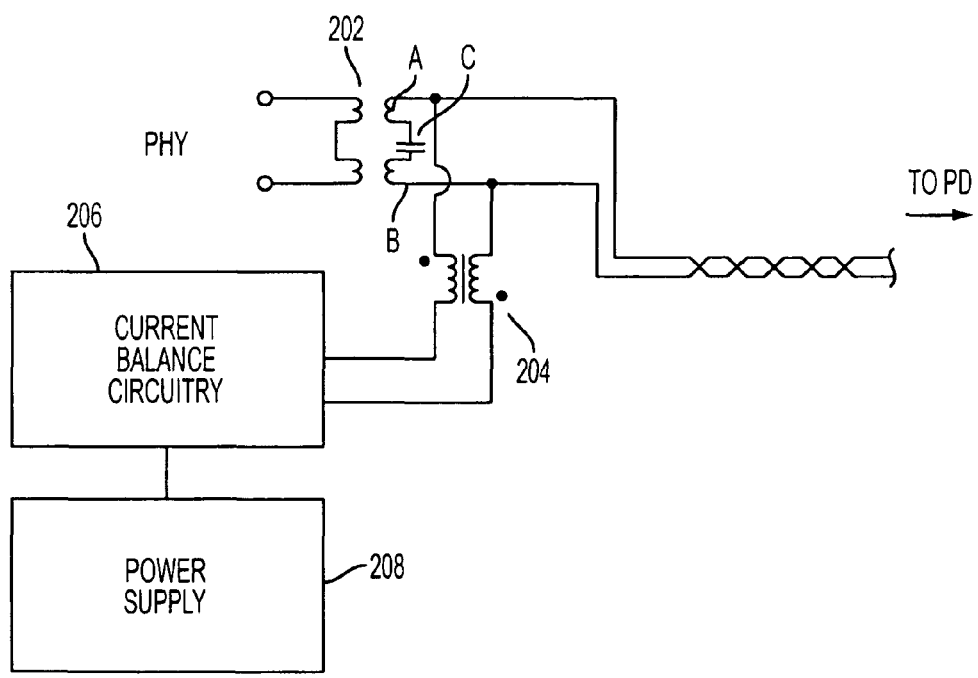
FIG. 3 illustrates a power distribution system of the present disclosure in which power is distributed between wires within a twisted pair.

As illustrated in FIG. 3, the current balancing circuit of the present disclosure may be used for providing the same current in each of the wires within a twisted pair of the wires. Each winding of the Ethernet data transformers coupled to the twisted pairs in the cable 16 may be split into two windings. To preserve the clarity of the diagram, FIG. 3 shows only a single Ethernet data transformer 202 coupled to a single twisted pair. However, one skilled in the art would realize that all Ethernet data transformers shown in FIG. 2 may be arranged in a similar way. The data transformer 202 may have capacitor C provided between the split windings connected to wires A and B of the respective twisted pair to provide an AC path for Ethernet data but prevent a DC current from flowing through the windings. Thus, the wires A and B within each twisted pair are no longer DC connected to each other.

Via respective windings of a transformer 204, wires A and B in the twisted pair may be coupled to a current balancing circuit 206 that controls the power from a PSE power supply 208 to provide the same DC current flow in each of the wires A and B within each twisted pairs. If an excessively high DC current flows through the winding of the data transformer 202, its core will saturate. As a result, the data transformer 202 will not perform properly and may block Ethernet data transmission. The current balancing circuit 206 may balance the current between the wires of the twisted pair to prevent resistance in the connector contacts, the cable or other elements of the wiring plant from causing an excessively high DC current in one or the other wire and saturating the data transformer 202.

Figure 4:
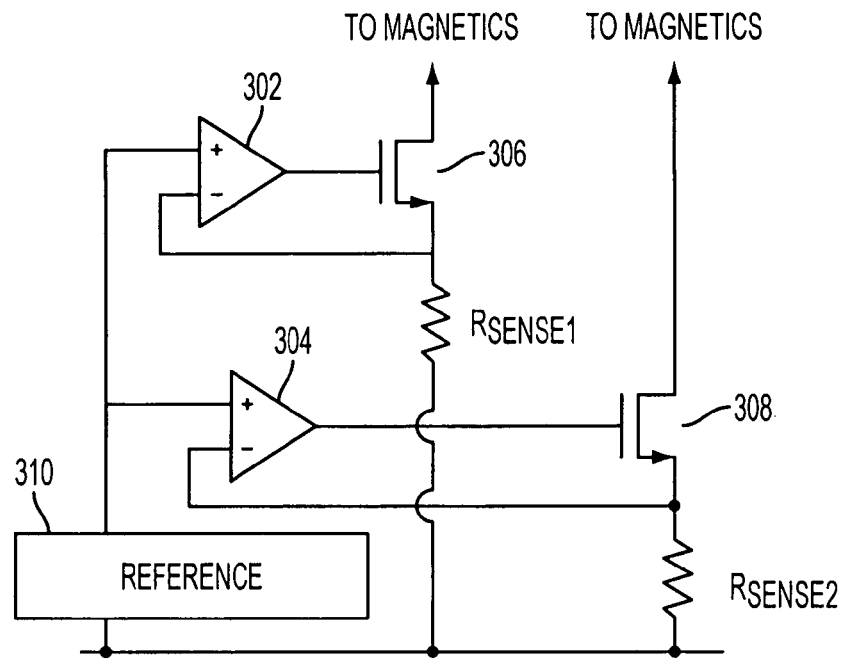
FIG. 4 illustrates a current balancing circuit in accordance with a first exemplary embodiment of the present disclosure.

FIG. 4 illustrates an exemplary embodiment of the present disclosure, in which the current balancing circuit includes operational amplifiers 302 and 304 driving gates of MOSFETs 306 and 308, respectively. Sense resistors $R_{sense1}$ and $R_{sense2}$ are coupled to the MOSFETs 306 and 308, respectively. A reference voltage source 310 may apply reference voltage $V_{ref}$ to non-inverting inputs of the amplifiers 302 and 304. The inverting input of the amplifier 302 may be supplied with voltage $V_{sense1}$ developed across the sense resistor $R_{sense1}$, whereas the inverting input of the amplifier 304 may be provided with voltage $V_{sense2}$ produced across the sense resistor $R_{sense2}$. The sense resistors $R_{sense1}$ and $R_{sense2}$ may have the same value to enable the current balancing circuit to maintain the sense voltages $V_{sense1}$ and $V_{sense2}$ at the same level corresponding to a reference voltage level.

In particular, the output of the amplifier 302 produces a voltage corresponding to a difference between the reference $V_{ref}$ and the sense voltage $V_{sense1}$, whereas the output of the amplifier 304 produces a voltage corresponding to a difference between $V_{ref}$ and $V_{sense2}$. For example, when the respective sense voltage $V_{sense}$ increasing with an increase in the output current of the corresponding MOSFET approaches $V_{ref}$, the output of the respective amplifier 302 or 304 responds by decreasing the voltage at the gate of the respective MOSFET 306 or 308. Reducing the voltage at the gate of the MOSFET will result in an increase of the MOSFET resistance, which will in turn reduce the output current of the MOSFET.

Accordingly, the current balancing circuit in FIG. 4 may provide the same current at the outputs of the MOSFETS 306 and 308. As shown in FIG. 2 the output currents of the current balancing circuit may be supplied via windings of the Ethernet data transformers to the respective twisted pairs of the Ethernet cable 16 to maintain the same current in each of the twisted pair. Alternatively, as shown in FIG. 3, the output currents of the current balancing circuit may be provided to the respective wires within a twisted pair to keep the current in each wire at the same level.

In a PoE system, where the total current in an Ethernet cable is not known in advance, the reference voltage $V_{ref}$ may be continuously adjusted to provide the current demanded by the PD. Without such adjustment, the reference voltage $V_{ref}$ may be set to an excessively high level increasing the output signals of the MOSFETs 306 and 308 to excessively high values. As a result, the respective feedback loops that cause current balancing may be broken.

For example, the reference voltage $V_{ref}$ may be adjusted using a third sense resistor supplied with the current from both balancing sense resistors. All 3 sense resistors may have the same value to provide the reference voltage $V_{ref}$ at a level corresponding to the half of the voltage level across the third sense resistor.

Figure 5:
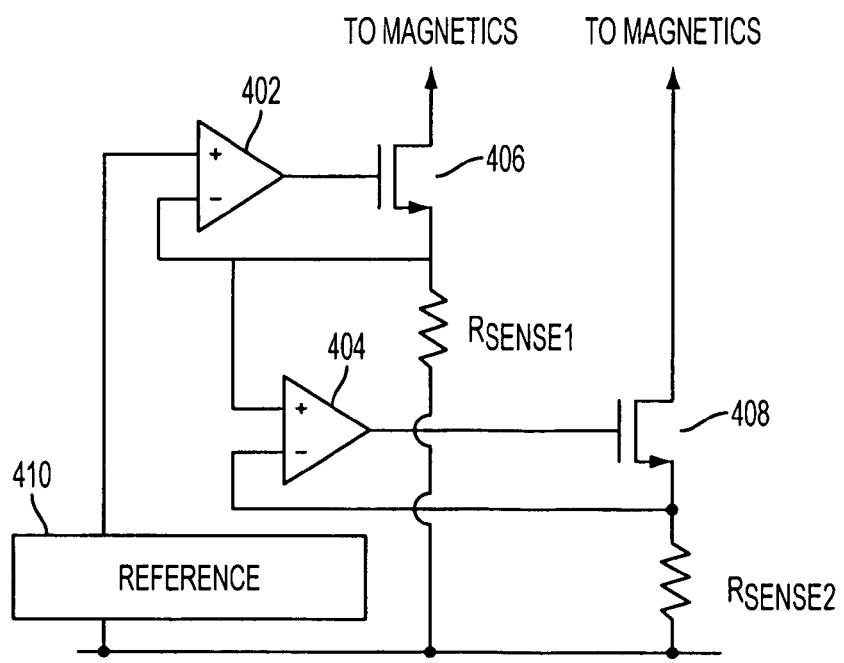
FIG. 5 illustrates a current balancing circuit in accordance with a second exemplary embodiment of the present disclosure.

FIG. 5 illustrates another exemplary embodiment of the present disclosure, in which the current balancing circuit uses a fixed or adjustable reference voltage. In particular, the current balancing circuit shown in FIG. 5 includes a current limit amplifier 402 and a balance amplifier 404 driving gates of MOSFETs 406 and 408, respectively. First and second sense resistors $R_{sense1}$ and $R_{sense2}$ are respectively connected to the MOSFETs 406 and 408. The sense resistors $R_{sense1}$ and $R_{sense2}$ may have the same value to maintain the currents flowing through these resistors at the same level.

A reference voltage source 410 applies reference voltage $V_{ref}$ to the non-inverting input of the current limit amplifier 402. For example, the reference voltage may be set to $V_{ref} = I_{LIM} \times R_{sense1}$, where $I_{LIM}$ is a predetermined current limit value. The inverting input of the current limit amplifier 402 is supplied with voltage $V_{sense1}$ developed across the first sense resistor $R_{sense1}$.

Hence, the output of the current limit amplifier 402 produces a voltage corresponding to a difference between the reference $V_{ref}$ and the sense voltage $V_{sense1}$. When the sense voltage $V_{sense1}$ increasing with an increase in the output current of the MOSFET 406 approaches $V_{ref}$, the output of the amplifier 402 responds by decreasing the voltage at the gate of the MOSFET 406. Reducing the voltage at the gate of the MOSFET 406 will result in an increase of the MOSFET resistance, which will in turn reduce the output current of the MOSFET 406 to maintain this current at the $I_{LIM}$ level.

The balance amplifier 404 compares the sense voltage $V_{sense1}$ with sense voltage $V_{sense2}$ developed across the sense resistor $R_{sense2}$ to maintain the sense voltage $V_{sense2}$ at a level of the sense voltage $V_{sense1}$. As a result, the output current of the MOSFET 408 is maintained at a level of the output current of the MOSFET 406.

Accordingly, the current balancing circuit in FIG. 5 may provide the same current at each of its outputs. As shown in FIG. 2, the output currents of the current balancing circuit may be supplied via windings of the Ethernet data transformers to the respective twisted pairs of the Ethernet cable 16 to maintain the same current in each of the twisted pair. Alternatively, as shown in FIG. 3, the output currents of the current balancing circuit may be provided to the respective wires within a twisted pair to keep the current in each wire at the same level.

Figure 6:
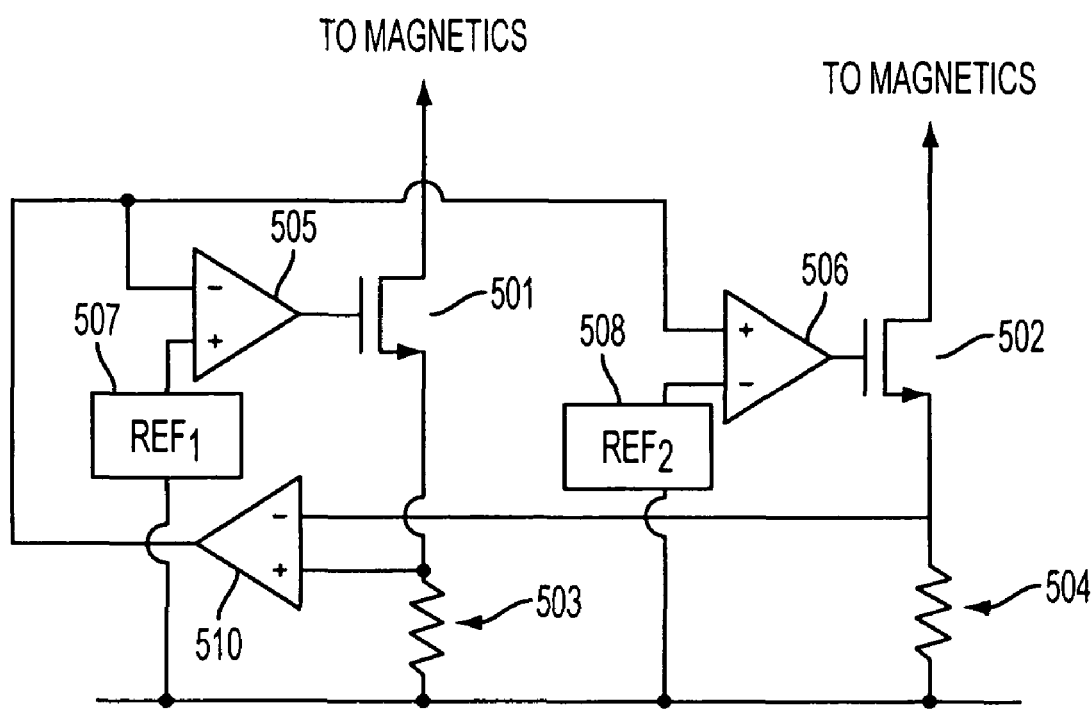
FIG. 6 illustrates a current balancing circuit in accordance with a third exemplary embodiment of the present disclosure.

FIG. 6. shows a further exemplary embodiment of the present disclosure, which is an enhancement of the current balancing circuit shown in FIG. 4. In the circuit in FIG. 6, switching elements 501 and 502 control the flow of current to magnetics and the PoE port. Current sense elements 503 and 504 provide an output that is proportional to the currents flowing through them. Difference amplifier 510 amplifies the outputs of the elements 503 and 504 producing a signal that is proportional to the difference between the currents flowing through the respective current sense elements. Thus, this signal represents the imbalance in the currents flowing through the elements 501 and 502. Difference amplifiers 505 and 506 compare the imbalance signal generated by the amplifier 510 to reference voltages produced by reference voltage sources 507 and 508. The output of the amplifiers 505 and 506 controls the switch elements 501 and 502, respectively, and thus controls the current flowing through them.

If more current flows through the element 503 than through the element 504, the element 503 will generate a larger signal. This causes the output voltage of the amplifier 510 to increase. When the output voltage of the amplifier 510 is above the reference voltage generated by the reference voltage source 507, the amplifier 505 decreases its output voltage, decreasing the control signal to the switching element 501 and thus reducing the current flowing through the elements 501 and 503. This has the desired effect of bringing the current flowing through the current sense elements 503 and 504 back into balance.

In the opposite situation, more current through the element 504 than through the element 503 causes the output of the amplifier 510 to decrease. When the output falls below the reference voltage created by the reference voltage source 508, the amplifier 506 will decrease its output, decreasing the control signal to the switch 502, thus reducing the current flowing through the elements 502 and 504 which brings the currents in the current sense elements 503 and 504 back into balance.

The PD to which the circuit in FIG. 6 supplies current, presents an unknown load. The current draw of the PD may change rapidly and the PD may present impedance characteristics like inductance and negative resistance which could easily cause the circuit in FIG. 6. to oscillate. Careful choice of the reference voltages generated by the sources 507 and 508 can prevent oscillations. If the reference voltages produced by the sources 507 and 508 are chosen such that only one of the amplifiers 505, 506 is operating in a closed feedback at a time, then they cannot both participate in small signal oscillations. Once this is accomplished the circuit can be compensated by traditional means.

For the amplifier 505 to be in a closed feedback loop, the output of the amplifier 510 must be above the output of the reference voltage source 507. While amplifier 506 will only be in a closed feedback loop when the output of the amplifier 510 is below the output of the reference voltage source 508. So if the output of the reference voltage source 507 is chosen to be above the output of the reference voltage source 508, only one of the amplifiers 505, 506 can be in a closed feedback loop at a time.

The method of using different references for a pair of comparators such as the amplifiers 505 and 506 is described in U.S. Pat. No. 6,166,527 assigned to Linear Technology Corporation, assignee of the present application, and incorporated herewith by reference. As shown in FIG. 7 and FIG. 8A of U.S. Pat. No. 6,166,527, it is possible to achieve the same effect by either using 2 separate reference signals to drive the amplifiers 505 and 506, as shown in FIG. 6 of the present application, or using the same reference and introducing an offset in the signal that is fed to both of them.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A system for providing power over a communication cable having at least first and second pairs of wires, comprising:
    a power supply device for supplying power over the communication cable to a powered device, and
    power distribution circuitry for controlling power distribution between the wires of the communication cable so as to provide balance of power between the first pair and the second pair, the power distribution circuitry including circuitry for adjusting voltages applied to the first and second pairs so as to control distribution of current between the first pair and the second pair.

2. The system of claim 1, wherein the power supply device is configured for supplying power over an Ethernet cable.

3. The system of claim 1, wherein the power distribution circuitry is configured for controlling distribution of current between the wires of the communication cable.

4. The system of claim 3, wherein the power distribution circuitry is configured for providing balance of current between the wires of the communication cable.

5. The system of claim 1, wherein the power distribution circuitry is configured for providing balance of current between the first pair and the second pair.

6. The system of claim 1, wherein the power distribution circuitry comprises a reference circuit for providing a reference voltage, first and second sense resistors, and first and second operational amplifiers for respectively comparing the reference voltage with first and second sense voltages across the first and second sense resistors.

7. The system of claim 6, wherein the power distribution circuitry further comprises first and second driving elements respectively coupled to outputs of the first and second operational amplifiers for controlling current values.

8. The system of claim 7, wherein each of the first and second driving elements includes one or more MOSFET transistors.

9. The system of claim 1, wherein the power distribution circuitry comprises a reference circuit for providing a reference voltage, a first sense resistors, and a current limit amplifier for comparing the reference voltage with a first sense voltage across the first sense resistor to limit a current value in accordance with the reference voltage.

10. The system of claim 9, wherein the power distribution circuitry further comprises a second sense resistor, and a balance amplifier for comparing a second sense voltage across the second sense resistor with the first sense voltage to provide a balance between current values at outputs of the current limit amplifier and the balance amplifier.

11. The system of claim 10, wherein the power distribution circuitry further comprises first and second driving elements respectively coupled to the outputs of the current limit amplifier and the balance amplifier for controlling the current values.

12. The system of claim 1, wherein the power distribution circuit comprises a pair of current sense elements and a first difference amplifier for producing a signal representing a difference between signals produced by the current sense elements.

13. The system of claim 12, wherein the power distribution signal further comprises a pair of second and third difference amplifiers having first inputs for receiving the output of the first difference amplifier, and second inputs for receiving respective reference values, a reference value supplied to the second difference amplifier differs from a reference value supplied to the third difference amplifier.

14. The system of claim 13, wherein the power distribution circuit further comprises first and second driving elements respectively coupled to outputs of the second and third difference amplifiers for controlling current values.

15. The system of claim 1, further comprising a transformer for coupling the power supply device to the communication cable, the transformer having a first winding corresponding to a first wire in the communication cable, and a second winding corresponding to a second wire in the communication cable.

16. The system of claim 15, further comprising a capacitive element provided between the first winding and the second winding to prevent a DC connection between the first and second winding.

17. The system of claim 1, wherein the power distribution circuitry is configured for balancing sum of currents in wires of the first pair with sum of currents in wires of the second pair.

18. A method of supplying power over a communication cable having at least first and second pairs of wires, comprising the steps of:
    supplying power over the communication cable, and
    adjusting voltages applied to the first and second pairs so as to control distribution of current between the first pair and the second pair.

19. The method of claim 18, wherein the power is supplied over an Ethernet cable.

20. The method of claim 18, wherein the step of adjusting voltages includes the step of providing balance of current between the first pair and the second pair of the communication cable.

21. The method of claim 18, wherein the step of adjusting voltages comprises balancing sum of currents in wires of the first pair with sum of currents in wires of the second pair.

22. A local area network comprising:
    at least a pair of network nodes,
    a network hub, and
    communication cabling having at least first and second pairs of wires for connecting the network nodes to the network hub to provide data communications,
    the network hub having a power supply device for providing power to a load over the communication cabling, the network including power distribution circuitry for controlling distribution of power between the wires so as to provide balance of power between the first pair and the second pair, the power distribution circuitry including circuitry for adjusting voltages applied to the first and second pairs so as to control distribution of current between the first pair and the second pair.

23. The network of claim 22, wherein the power distribution circuitry is configured for balancing sum of currents in wires of the first pair with sum of currents in wires of the second pair.

* * * * *